United States Patent [19]

Chauveteau et al.

[11] 4,095,651

[45] Jun. 20, 1978

[54] PROCESS FOR SELECTIVELY PLUGGING AREAS IN THE VICINITY OF OIL OR GAS PRODUCING WELLS IN ORDER TO REDUCE WATER PENETRATION

[75] Inventors: Guy Chauveteau, Rueil Malmaison; Jean-Claude Moulu, Le Vesinet, both of France

[73] Assignee: Institut Francais du Petrole, Rueil Malmaison, France

[21] Appl. No.: 726,225

[22] Filed: Sep. 24, 1976

[30] Foreign Application Priority Data

Sep. 25, 1975 France .................................. 75 29833

[51] Int. Cl.$^2$ ............................................. E21B 33/138
[52] U.S. Cl. .................................................... 166/294
[58] Field of Search ................................. 166/292–295, 166/270, 300, 273, 274, 305 R; 252/8.55 D

[56] References Cited

U.S. PATENT DOCUMENTS

| | | | |
|---|---|---|---|
| 3,308,885 | 3/1967 | Sandiford | 166/295 |
| 3,749,172 | 7/1973 | Hessert et al. | 166/275 X |
| 3,757,863 | 9/1973 | Clampitt et al. | 166/270 X |
| 3,949,811 | 4/1976 | Threlkeld et al. | 166/294 |

*Primary Examiner*—Stephen J. Novosad
*Attorney, Agent, or Firm*—Millen & White

[57] ABSTRACT

Process for reducing or suppressing water penetration into oil or gas producing wells which comprises injecting an aqueous polymer solution of controlled viscosity into an underground formation and then placing the well on production. The polymer is, for example, hydrolyzed polyacrylamide and the solution is preferably a salt solution.

13 Claims, No Drawings

PROCESS FOR SELECTIVELY PLUGGING AREAS IN THE VICINITY OF OIL OR GAS PRODUCING WELLS IN ORDER TO REDUCE WATER PENETRATION

This invention relates to a method for reducing or completely stopping penetration of water from an underground formation containing hydrocarbons into a well bored therein. This method stops water penetration but does not reduce the passage of oil or gas towards the well.

Water is often present as brine in the same formation as oil or gas. The production of oil or gas thus results in the production of water in such an amount that difficulties appear: water results directly or not in settlings in the vicinity of the well or in the well tubing, it increases considerably corrosion of all the metal parts at the bottom or ground level, it also uselessly increases the amount of fluids to be pumped, circulated and stocked, it creates with oil emulsions which cannot be easily broken at the surface and which result in plugging the pores of the formation.

Various methods for reducing water penetration into producing wells have been disclosed and tested: they often comprise the setting up of a water-proof barrier, but the plugging agents usually injected stop oil or gas to nearly the same extent as water. The elements of these barriers may be, for example, concrete, resins, suspensions of solid particles or paraffins.

More recently, polymers have been used with greater success than the above plugging agents. The way the polymers operate is as follows: the polymers, when injected as solutions into the porous medium, adsorb at the surface of the solid and reduce the pore radius as long as they are in aqueous medium; the polymers are thus able to reduce water penetration. On the other hand, the non-aqueous fluids, such as oil and, above all, gas, dehydrate the adsorbed macromolecules which then occupy only a negligible volume along the wall and then leave the passage entirely free.

This method is not quite satisfactory: it is not very efficient in a very permeable medium, unless using solutions of high polymer concentration, thus highly viscous solutions which cannot be injected easily. The state of the art is illustrated in this respect by U.S. Pat. No. 3,308,885 which discloses the treatment of wells with aqueous solutions of hydrolyzed polyacrylamide.

The object of this invention is to reduce water production in producing wells without decreasing oil or gas production.

The process of the invention is not similar to the secondary recovery process, wherein a solution of polymer, usually at low concentration (a few hundreds of parts per million) is injected from one or more wells at a sufficient pressure to push the solution into the formation and displace a portion of oil from the formation, which portion is discharged through a series of wells other than the injected wells. The volume of solution injected is roughly that of the formation. It is well known that polymer-containing water is more efficient, since more viscous, than water alone for this type of recovery.

The process of the invention is also not similar to a process of adding polymer to drilling fluids. These fluids function to lubricate the drilling tool, to lift the cuttings, to exert a counterpressure substantially equal to the bottom pressure and to plug the walls of the well; they circulate in close circuit between the bottom and the surface where they are filtered and their composition adjusted. They are used in small amounts, roughly the same as the volume of the well.

The process of the invention, which aims to reduce water penetration into a producing well, comprises injecting from said well into the formation a substantial amount of polymer solution, although far lower than the volume of oil present in the formation. The treatment extends up to a few tens of meters from the well, which usually represents a volume of solution of a few hundred cubic meters and a weight of dry polymer from 200 to 1000 kg per each meter in thickness of the formation.

The main advantage of the above method lies in the fact that the plugging is more efficient, even in permeable medium, than according to conventional methods.

More precisely, the invention concerns a process for reducing or suppressing water penetration from an underground formation into at least one portion of a well for oil and/or hydrocarbon gas production traversing said formation, which comprises the following steps:

a. injecting an aqueous solution of a polymer P at a concentration C from a well into the portion of the formation from where water penetration into the well must be reduced or suppressed, the viscosity $\eta_2$ of said solution being such that $\eta_2 < \eta_1$ and $\eta_1$ is the viscosity of a solution of the water-soluble polymer P at concentration C in water of the formation, b. placing the well on production of oil and/or gas, which permits the fluids of the formation to contact that part of the formation which contains the adsorbed polymer, whereby the oil and/or gas selectively passes through said part of the formation to flow into the well, while the water production is reduced.

By solution of a polymer, it is meant a stable limpid solution.

The fact that $\eta_2 < \eta_1$ shows that the liquid employed at paragraph (a) is not as good a solvent as the water of the formation, with respect to the polymer; that means that said liquid has physico-chemical properties impeding the polymer macromolecules from a large volume: they have thus a low expansion in such a solvent. As concerns the hydrolyzed polyacrylamides, this liquid is, for example, a salt solution.

Advantageous values of $\eta_2$ are $\eta_2 \leq 0.5\ \eta_1$ and preferably $\eta_2 \leq 0.1\ \eta_1$, where $\eta_2$ and $\eta_1$ are given in poises.

A salt solution is defined as an aqueous solution of one or more salts of alkali or alkaline-earth metals, particularly NaCl, KCl, $MgCl_2$, $MgSO_4$, $CaCl_2$, $Na_2SO_4$, $K_2SO_4$ and/or $NaNO_3$; generally chlorides, sulfates or nitrates of such metals as sodium, potassium, calcium or magnesium. Preferred solutions contain sodium chloride as major component. The salts of alkaline-earth metals are less desirable, particularly when used in high proportion since they can produce undesired, precipitation for example when the medium contains carbonates or has a pH of at least 9.

It is also important to avoid the presence of substantial amounts of ions of metals other than the alkali or alkaline-earth metals, since such ions can cross-link certain polymers, which results in the complete (non-selective) plugging of the treated zone.

The problem which is solved by the process of the present invention is distinquished completely from the problem of plugging the wells by cross-linking of a polymer.

The salt concentration of the salt solution of polymer may be selected within broad limits, provided the above condition of viscosity is fulfilled.

It depends on the nature and the salt concentration of the water of the formation and also on the nature of the salt present in the polymer solution, so that it is not possible to give a general range of useful values. A simple preliminary test permits a determination of the most favorable salt concentration. As a rule, the salts of alkali metals must be used at a higher concentration than the salts of alkaline-earth metals.

Relatively high concentrations are, in most cases, particularly favorable; for example, when using NaCl, at least 20 grams and preferably at least 75 grams of salt per liter of water, particularly 100 to 200 g per liter. With calcium chloride, a useful concentration is at least 5 g per liter, preferably 10 to 20 g per liter. There is no upper limit, except that which would prevent the polymer from remaining in solution at the concentration C.

As a rule, for a given salt, the viscosity of the polymer solution decreases as the salt concentration increases. Thus, if the water of the formation contains NaCl as major component, there can be advantageously used, in the present process, a solution of polymer whose NaCl concentration is higher than that of the water of the formation.

The plugging material to be used is a water-soluble polymer which may be a partially hydrolyzed polyacrylamide, although the use of another water-soluble polymer is not excluded. In fact, the process is based on the irreversible adsorption of the polymer at the solid surface of the porous medium and on the possibility of decreasing the amount of solvent in which the polymer is to be dissolved before injection.

The polymer concentration in the aqueous solution is preferably as high as possible, provided it is compatible with the salt concentration in the medium. It is usually from 500 to 20,000 ppm (parts per million) by weight. A preferred polymer is a polyacrylamide or a copolymer of acrylamide in which 8 – 70% and preferably 8 – 25% of the amide groups have been hydrolyzed. Its molecular weight is usually high, at least 200,000 and preferably above 3,000,000.

Examples of satisfactory polyacrylamides are:
a polyacrylamide of molecular weight about 3,000,000 whose amide groups have been hydrolyzed to an extent of about 20%.
a polyacrylamide of molecular weight about 1,000,000 whose amide groups have been hydrolyzed to an extent of about 25 – 35%.
a polyacrylamide of molecular weight about 2,000,000 whose amide groups have been hydrolyzed to an extent of about 8 – 10%.

The amount of polymer to be injected in the production zone surrounding the well depends on local conditions; it is, in most cases, 50 to 5,000 kg and preferably 200 to 1,000 kg per meter in thickness of the treated zone.

The efficiency of the process may be increased by favoring the formation of conglomerates, for example, by dissolving the polymer in the presence of formaldehyde and oxygen, or, during injection, by creating mechanical stresses within the solution by the effect of speed. These examples are not limitative of the ways to produce conglomerates.

The way the polymer solution is injected is not new per se; it is taught, for example, in U.S. Pat. No. 3,308,885. As a rule, a pressure is applied to the polymer solution, which is higher than the pressure exerted by the fluids at the level selected for the treatment (hydrostatic pressure); this permits the solution to penetrate the formation up to points remote from the well, preferably by at least 20 meters, in the above-stated proportions.

Experiments have been conducted, some according to the conventional technique, others according to the process of the invention, as described above.

The experiments and the viscosity determinations for the different solutions have been carried out at the constant temperature of 30° C.

EXAMPLE 1 a. A porous medium consisting of coarse clay-free sand (grain size: 200 to 300 microns, permeability: 5 darcy) is saturated with 1 g/liter NaCl brine to simulate water of the formation. A polymer solution prepared from 1 g/liter NaCl aqueous solution and a partially hydrolyzed polyacrylamide (average molecular weight: 3,000,000; hydrolysis degree: 20%) at the concentration of 12,000 ppm is injected into the porous medium. The $\eta_1$ viscosity of this solution is about $3 \times 10^3$ poises. Water containing 1 g/liter NaCl is then circulated and there is found a permeability decreased by a factor of 20 (the permeability is thus 0.25 darcy). This reduction of permeability is due to the presence of the polymer adsorbed on the solid walls of the medium, which conforms to the conventional treatment as above mentioned.

b. A 12,000 ppm solution of the same polymer in water of high salt content (100 g/liter NaCl) and whose $\eta_2$ viscosity is 6.75 poises is injected into a porous medium identical to the preceeding one, which medium has been previously saturated with a 1 g/liter NaCl brine. The further circulation of formation water at 1 g/liter NaCl shows that permeability has decreased by a factor of about 55 (i.e. The permeability is 0.09 darcy). The latter permeability reduction is higher than in the above test and shows the improved result obtained according to the invention. The mechanism appears to be as follows: the swelling of the adsorbed molecules due to the salt concentration change adds to the effect of the polymer adsorption, and this constitutes the new feature of the present invention.

These experiments constitute no limitation, particularly as concerns the nature of the porous medium. The tests may be carried out more easily with better results in porous clayish media of lower permeability.

EXAMPLE 2

This experiment shows the difference between the known technique and that of the invention in a clayish medium. The porous medium is made of a mixture of sand (200 to 300 microns) and clay (8% of the mixture by weight), the permeability being about 1 darcy for water containing 1 g/liter NaCl simulating formation water.

a. According to a conventional technique, a solution of polymer prepared from water containing 1 g/liter NaCl and a partially hydrolyzed polyacrylamide (average molecular weight of 3,000,000 and hydrolysis degree of 20%) at a concentration of 1600 ppm by weight is injected into the porous medium. The viscosity $\eta_1$ of this solution is about 16 centipoises. Water containing 1 g of NaCl per liter is then circulated therethrough and it is observed that permeability is reduced by a factor of 12.5.

b. According to the technique of the present invention, a solution of the same polymer at the same concentration of 1600 ppm in salted water (20 g of NaCl per liter) is injected into a medium as described above; the viscosity $\eta_2 < \eta_1$ of the solution is 5 centipoises. Formation water containing 1 g NaCl per liter is then circulated therethrough and it is found that permeability has been reduced by a factor of 20, which is substantially higher than the reduction obtained with the conventional technique.

EXAMPLE 3

This example shows that the technique of the present invention may be applied to natural clayish media with very important permeability reductions. The porous medium is a sample of clayish sandstone from "Les Vosges" (region of France) whose permeability is 40 mdarcy for formation water containing 1 g NaCl per liter.

a. According to the conventional technique, a solution of polymer prepared from water containing 1 g NaCl per liter, simulating formation water, and from the same partially hydrolyzed polyacrylamide at the concentration of 3,000 ppm by weight is injected into the porous medium. The viscosity $\eta_1$ of this solution is about 125 centipoises. Water containing 1 g NaCl per liter is then circulated and it is found that the permeability has been reduced by a factor of 35. The permeability to oil is 1.5 times less.

b. According to the technique of the present invention, a solution of the same polymer at the same concentration of 3,000 ppm in water of high salt content (100 g NaCl per liter) is injected into an identical porous medium; the viscosity $\eta_2 < \eta_1$ of the solution is 10 centipoises. The further circulation of water of low salt content (1 g NaCl per liter) shows a permeability reduction by a factor of 55. The permeability to oil is 1.5 times less.

EXAMPLE 4

This example shows that, in a porous medium of different nature (limestone), the technique of the present invention is better than the conventional technique and that permeability to oil is not substantially affected. The porous medium is Saint-Maximin limestone whose permeability is about 1 darcy. Formation water is a 1 g per liter NaCl aqueous solution.

a. According to the conventional technique, a solution of polymer is prepared from water containing 1 g NaCl per liter, simulating formation water, and from the same partially hydrolyzed polyacrylamide at the concentration of 3,000 ppm; and injected into the porous medium. The viscosity $\eta_1$ of this solution is 125 centipoises. Water containing 1 g NaCl per liter is then circulated therethrough and it is found that permeability has been reduced by a factor of 6.5, while the permeability to subsequently injected oil remains practically unaffected (reduction factor lower than 1.5)

b. According to the technique of the present invention, a solution of the same polymer at the same concentration of 3,000 ppm in water containing 100 g NaCl per liter is injected into an identical medium. The viscosity of the solution $\eta_2 < \eta_1$ is 10 centipoises. The circulation of formation water (1 g NaCl per liter) shows an increase of the permeability reduction factor (15) while the oil permeability reduction factor is only 1.4.

What we claim is:

1. A process for reducing or suppressing water penetration from an underground formation into at least one portion of a well for oil and/or hydrocarbon gas production traversing said formation, which comprises the following steps:

a. injecting a stable limpid aqueous saline solution of a water-soluble non-crosslinked polymer P at a concentration C from a well into the portion of the formation from where water penetration into the well must be reduced or suppressed, said stable limpid, saline polymeric solution having an inversely proportional viscosity-salt concentration behavior, the viscosity $\eta_2$ of said solution being such that $\eta_2 < \eta_1$ where $\eta_1$ is the viscosity of a solution of the water-soluble polymer P at concentration C in water of the formation, the lower viscosity $\eta_2$ being obtained in said stable, limpid, saline, polymeric solution by the presence of a sufficient quantity of alkali metal salt, alkaline earth metal salt, or mixtures thereof;

b. placing the well on production of oil and/or gas which permits the fluids of the formation to contact that part of the formation which contains the adsorbed polymer, whereby the oil and/or gas selectively passes through said part of the formation to flow into the well, while the water production is reduced.

2. A process according to claim 1, wherein the concentration C is from 500 to 20,000 ppm by weight.

3. A process according to claim 1, wherein $\eta_2 \leq 0.5\ \eta_1$.

4. A process according to claim 3, wherein the polymer is a polyacrylamide in which 8 to 70% of the amide groups have been hydrolyzed and whose molecular weight is higher than 200,000.

5. A process according to claim 1, wherein the polymer is a polyacrylamide in which 8 to 70% of the amide groups have been hydrolyzed and whose molecular weight is higher than 200,000.

6. A process according to claim 5, wherein the molecular weight is higher than 3,000,000.

7. A process according to claim 1, wherein the liquid used in step (a) is an aqueous solution of at least one salt of an alkali metal.

8. A process according to claim 7, wherein the salt is sodium chloride and the salt concentration of the aqueous solution is at least 20 g per liter.

9. A process according to claim 7, wherein the salt is sodium chloride and its concentration is 100 to 200 g per liter.

10. A process according to claim 7, wherein the salt is calcium chloride and the salt concentration of the aqueous solution is at least 5 g per liter.

11. A process according to claim 1, wherein said polymer is partially hydrolyzed polyacrylamide.

12. A process according to claim 11, wherein the liquid used in step (a) is an aqueous solution of at least one salt of an alkali metal.

13. A process according to claim 1, wherein $\eta_2 \leq 0.1\ \eta_1$.

* * * * *